United States Patent
Roberson et al.

(10) Patent No.: US 10,655,448 B2
(45) Date of Patent: May 19, 2020

(54) DOWNHOLE CEMENT STRAIN GAUGE

(71) Applicant: Halliburton Energy Services, Inc., Houston, TX (US)

(72) Inventors: Mark Roberson, Cary, NC (US); Scott Goodwin, Chapel Hill, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 133 days.

(21) Appl. No.: 16/067,030

(22) PCT Filed: Mar. 29, 2016

(86) PCT No.: PCT/US2016/024633
§ 371 (c)(1),
(2) Date: Jun. 28, 2018

(87) PCT Pub. No.: WO2017/171723
PCT Pub. Date: Oct. 5, 2017

(65) Prior Publication Data
US 2019/0017365 A1 Jan. 17, 2019

(51) Int. Cl.
| | | |
|---|---|---|
| *E21B 47/00* | (2012.01) | |
| *E21B 47/12* | (2012.01) | |
| *E21B 49/00* | (2006.01) | |
| *G01B 7/16* | (2006.01) | |

(52) U.S. Cl.
CPC ........ *E21B 47/0005* (2013.01); *E21B 47/122* (2013.01); *E21B 49/006* (2013.01); *G01B 7/16* (2013.01); *G01B 2210/58* (2013.01); *G01B 2210/60* (2013.01)

(58) Field of Classification Search
CPC .. E21B 47/0005; E21B 49/006; E21B 47/122; E21B 33/14; G01B 7/16; G01B 7/18; G01B 7/22; G01B 2210/58; G01B 2210/60
See application file for complete search history.

(56) References Cited

U.S. PATENT DOCUMENTS

| | | |
|---|---|---|
| 2002/0179301 A1 | 12/2002 | Schultz et al. |
| 2005/0034863 A1 | 2/2005 | Dillenbeck et al. |
| 2005/0252657 A1 | 11/2005 | Tocalino et al. |
| 2014/0111349 A1 | 4/2014 | Roberson et al. |
| 2014/0354443 A1* | 12/2014 | Roberson .............. E21B 47/122 340/853.2 |
| 2014/0367092 A1* | 12/2014 | Roberson ............... E21B 47/00 166/250.01 |

FOREIGN PATENT DOCUMENTS

WO 2014/042867 A1 3/2014

OTHER PUBLICATIONS

International Search Report and Written Opinion issued in related PCT Application No. PCT/US2016/024633 dated Dec. 26, 2016, 14 pages.

* cited by examiner

*Primary Examiner* — Michael R Wills, III
(74) *Attorney, Agent, or Firm* — Thomas Rooney; Baker Botts L.L.P.

(57) ABSTRACT

In one embodiment, a system includes a casing disposed within a wellbore, one or more data collection tools coupled to the casing, and one or more sensors disposed within an annulus of the wellbore. Each of the one or more sensors include a substrate, a strain-sensitive element coupled to the substrate, and a transceiver coupled to the substrate and configured to communicate with the one or more data collection tools.

20 Claims, 6 Drawing Sheets

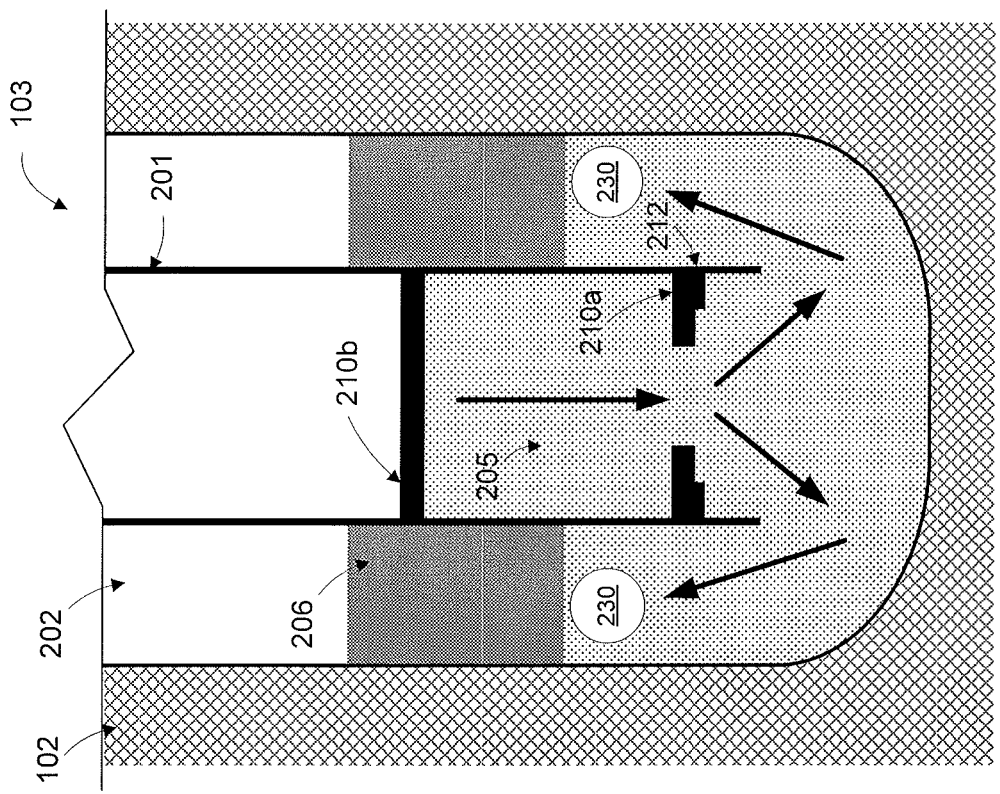
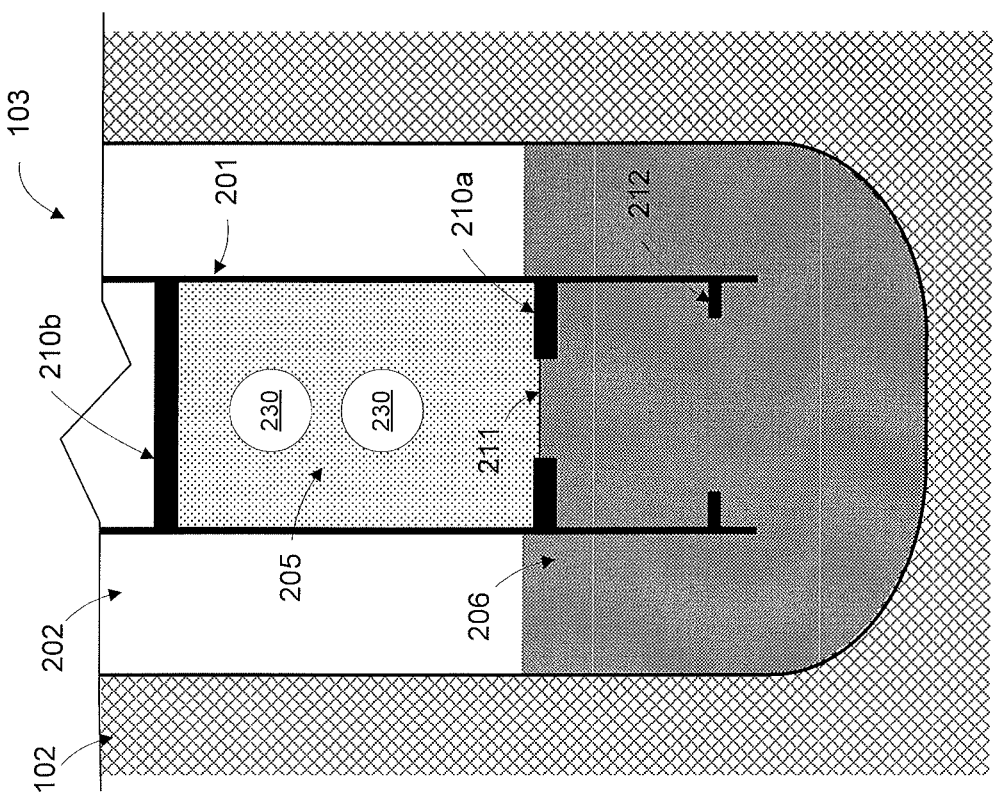
FIG. 2A
FIG. 2B

DOWNHOLE CEMENT STRAIN GAUGE

CROSS-REFERENCE TO RELATED APPLICATION

The present application is a U.S. National Stage Application of International Application No. PCT/US2016/024633 filed Mar. 29, 2016, which is incorporated herein by reference in its entirety for all purposes.

BACKGROUND

This disclosure generally relates to a strain gauge. In particular, this disclosure relates to a strain gauge that may be used in downhole applications such as wellbore cementing operations.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, adding one or more casings into the wellbore, cementing to seal the wellbore, treating the wellbore to optimize production of hydrocarbons, and performing the necessary steps to produce and process the hydrocarbons from the subterranean formation. During wellbore cementing operations, one or more measurements such as strain may be desired to ensure proper cementing of the wellbore. Such measurements may be difficult to obtain, however.

BRIEF DESCRIPTION OF THE DRAWINGS

These drawings illustrate certain aspects of certain embodiments of the present disclosure. They should not be used to limit or define the disclosure.

FIGS. 2A-2B illustrate an example wellbore casing and cementing operation in accordance with embodiments of the present disclosure.

Figure 1:
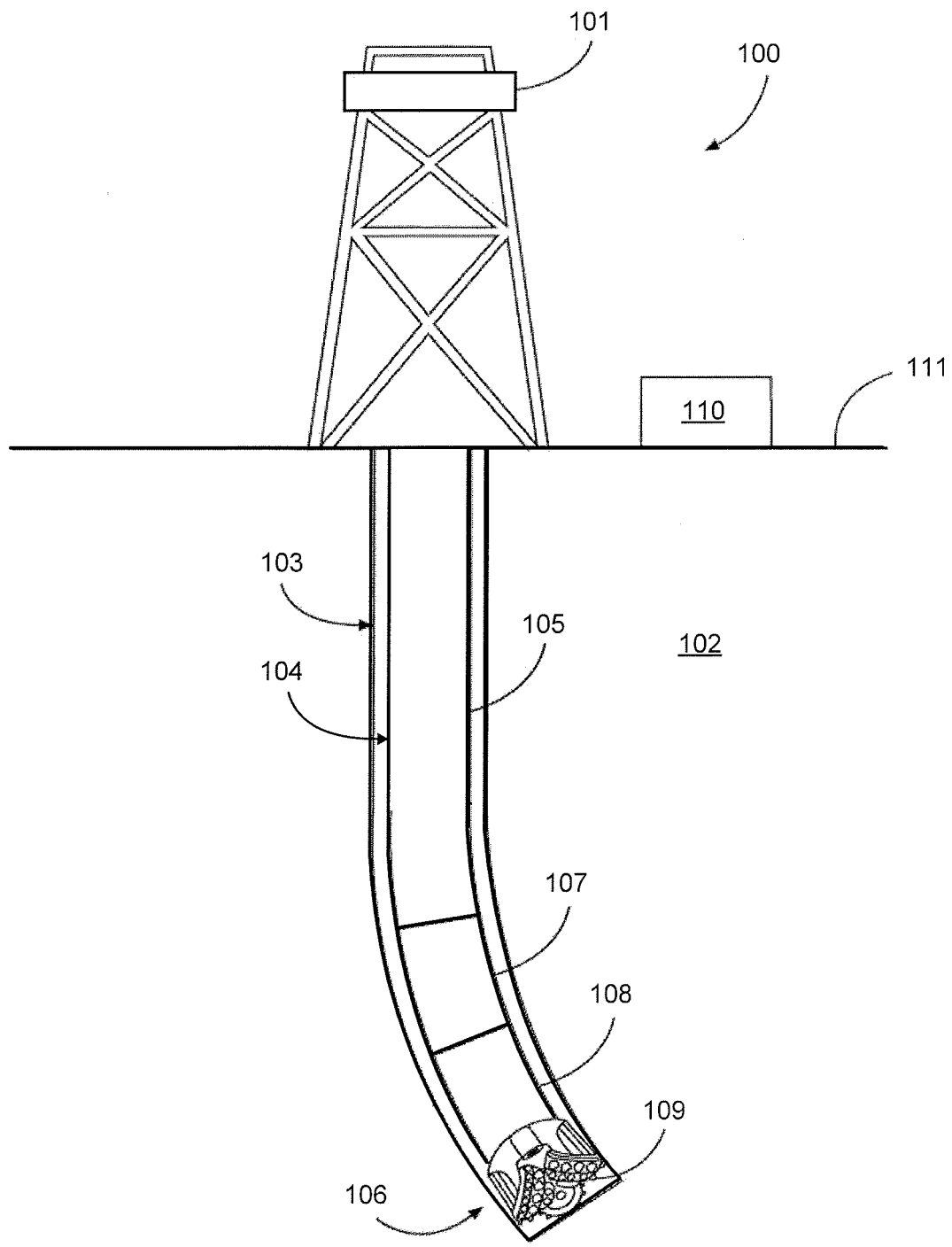
FIG. 1 illustrates an example downhole drilling system in accordance with embodiments of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes sensors for use in downhole applications that may measure one or more strain characteristics, such as the strain present in cement surrounding and sealing wellbore casings. In order to measure the strain characteristics, strain gauges incorporated into downhole sensors may include a strain-sensitive element whose resistance is affected by the forces (e.g., strain) incident upon it. The strain-sensitive element may be a component whose resistance changes monotonically with the strain applied thereto, such as a linear-resistive element whose resistance changes linearly with the strain applied thereto. Changes in the force incident upon the strain-sensitive element may be measured using a four-point resistance method, in certain embodiments. In other embodiments, the strain-sensitive element may be in a resonant circuit with capacitors and/or inductors, and the changes in force incident upon the strain-sensitive element may be determined based on changes in the Q of the resonance of the resonant circuit. In yet other embodiments, the strain-sensitive element may be a component whose capacitance and/or inductance changes as force is applied thereto. As an example, the strain-sensitive element may be a component whose resistance is minimal, but whose capacitance changes monotonically (e.g., linearly) with strain applied. In certain embodiments, the strain-sensitive element may be designed such that its resistance, capacitance, and/or inductance changes in such a way that allows for the Q of the resonant circuit (e.g., the frequency width of the resonance) to remain approximately constant.

The strain-sensitive element of the strain gauge may be located on the sensor device such that it is closely located to the material surrounding the device (e.g., cement in the annulus of a wellbore). Such a location may avoid effects caused by the mechanical properties of the substrate, and therefore lead to more accurate measurements of the strain in the surrounding material. For example, in certain embodiments, the strain-sensitive element may have a mechanical standoff from the substrate of the device in order to avoid having strain measurements affected by forces from the substrate. The strain-sensitive element and other components of the sensor may be enveloped or encapsulated in a non-rigid, compliant material that allows for the transfer of strain present around the sensor device to the strain-sensitive element of the sensor device.

Strain gauges incorporated into sensor devices according to the present disclosure may be placed into cement during a wellbore casing and cementing operation such that the strain gauges are positioned in the cement located in the annulus of the wellbore at the completion of the cementing process. Measurements from the sensor devices may be collected using data collection tools that are coupled to the casing in the wellbore. The data collection tools may communicate with the sensor devices using radio frequency signals or other suitable wireless communication techniques. An interrogation tool may be lowered downhole at a desired time and placed proximate to the data collection tools to collect the sensor data from those data collection tools. The communication between the interrogation tool and the data collection tools may be done using magnetic or acoustic signals, to allow for the transmission of such signals through the casing material.

To facilitate a better understanding of the present disclosure, the following examples of certain embodiments are given. In no way should the following examples be read to limit, or define, the scope of the invention. For example, embodiments of the present disclosure may be applicable to horizontal, vertical, deviated, or otherwise nonlinear wellbores in any type of subterranean formation. As another example, embodiments may be applicable to injection wells as well as production wells, including hydrocarbon wells.

FIG. 1 illustrates an example downhole drilling system 100 in accordance with embodiments of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD ("Logging-while-drilling"/"Measurement-while-drilling") apparatus 107 which may include logging tools (e.g., formation logging tools). During drilling operations, drill bit 109 rotates to create wellbore 103, and steering assembly 108 may function to steer drill bit 109 in one or more directions. LWD/MWD apparatus 107 may take one or more measurements during such drilling operations.

Control unit 110 located at the surface 111 may include a processor and memory device, and may communicate with elements of the BHA 106 (e.g., logging tools in the LWD/MWD apparatus 107). The control unit 110 may receive data from and send control signals downhole, such as to the BHA 106 or components thereof. Additionally, in some embodiments, at least one processor and memory device may be located downhole within the BHA 106 for the same purposes. The LWD/MWD apparatus 107 may log the formation 102 (i.e., sample, test, and/or otherwise obtain information about the formation) both while wellbore 103 is being drilled, and after wellbore 103 is drilled to provide information regarding ongoing subterranean operations.

Modifications, additions, or omissions may be made to FIG. 1 without departing from the scope of the present disclosure. For example, components may be added to downhole drilling system 100 or removed from downhole drilling system 100 as required or desired based upon the drilling operations.

FIGS. 2A-2B illustrate an example wellbore casing and cementing operation in accordance with embodiments of the present disclosure. At some stage in the drilling process, drill string 105 is removed from wellbore 103, and casing 201 is inserted into wellbore 103. Casing 201 may be made of any suitable material, which may include a metal material such as steel in particular embodiments. After casing 201 is run into wellbore 103 at a desired distance, cement 205 may be injected down casing 201 to secure casing 201. This may include introducing bottom plug 210a into the interior of casing 201. Bottom plug 210a may prevent remaining drilling fluid 206 present in wellbore 103 from mixing with cement 205. For instance, bottom plug 210a may comprise diaphragm 211 that prevents cement 205 and drilling fluid 206 from passing therethrough. Cement 205 is then added into wellbore 103 behind bottom plug 210a. Top plug 210b is then added after cement 205 as shown in FIG. 2A. Pressure is then added to top plug 210b to push the column of cement 205 down casing 201. Bottom plug 210a is caught just before the end of casing 201 by float collar 212. After this, diaphragm 211 experiences increased pressure from cement 205 until diaphragm 211 is broken within bottom plug 210a, permitting cement 205 to flow past bottom plug 210a and up the outside of casing 201 and into annulus 202 as shown in FIG. 2B.

In certain embodiments, one or more sensors 230 may be placed into cement 205 during the cementing process. Sensors 230 are then pumped down the interior of casing along with cement 205 during the cementing process. Sensors 230 may accordingly be positioned within various portions of annulus 202 at the completion of the cementing process. Sensors 230 may include any suitable type of sensor, and may include a strain gauge according to the present disclosure. For instance, sensors 230 may include strain gauges as described further below.

Modifications, additions, or omissions may be made to FIGS. 2A-2B without departing from the scope of the present disclosure. For example, fewer components or additional components beyond those illustrated may be included, such as additional casings beyond casing 201 (e.g., additional casings between casing 201 and formation 102). As another example, additional fluids may be used in the cementing process, such as spacer fluids.

Figure 3:
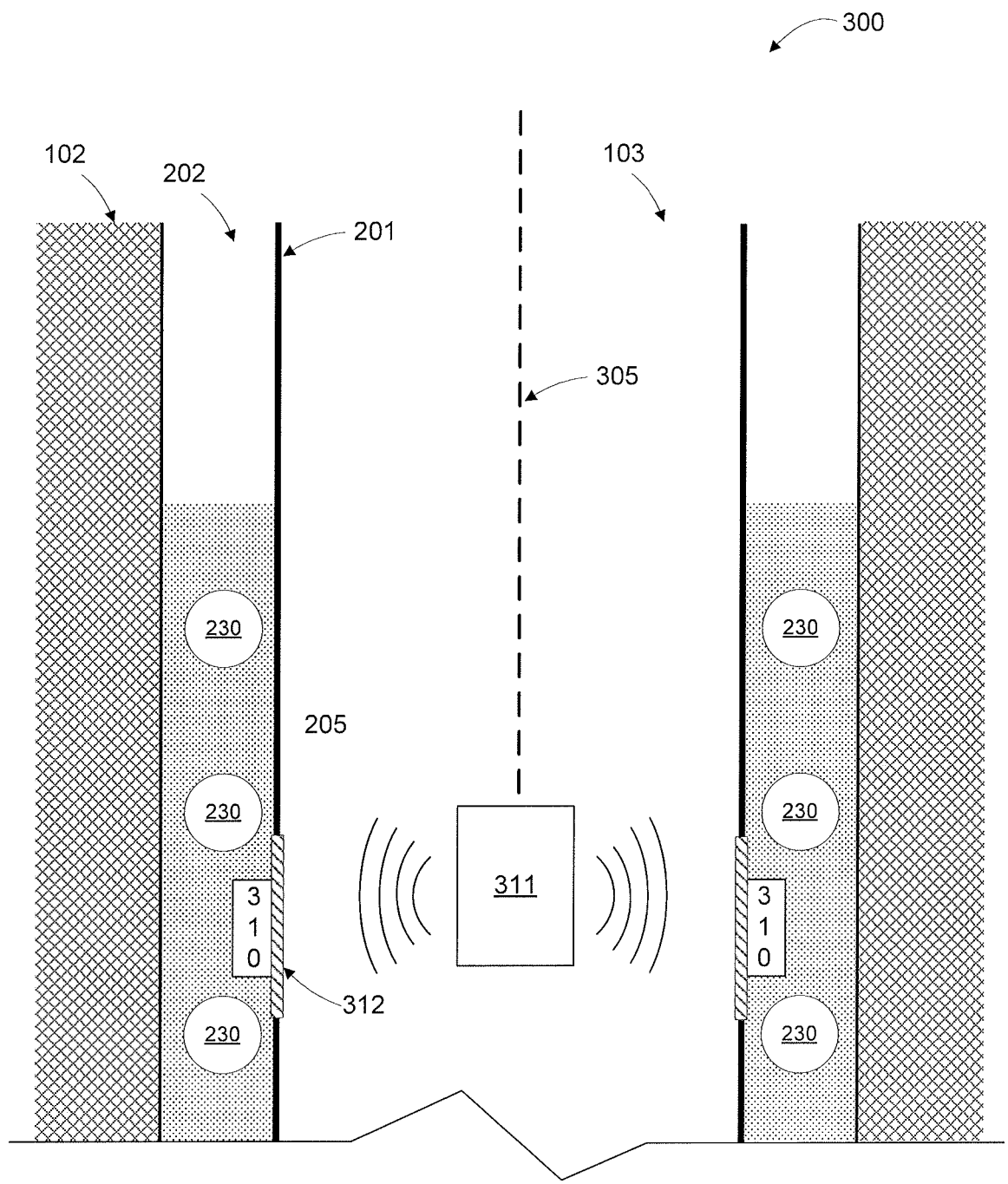
FIG. 3 illustrates an example system for collecting data from strain gauge sensors in accordance with embodiments of the present disclosure.

FIG. 3 illustrates an example system 300 for collecting data from strain gauge sensors in accordance with embodiments of the present disclosure. System 300 includes sensors 230 disposed in cement 205 in annulus 202 of wellbore 103, data collection tools 310 coupled to casing 201, and interrogation tool 311 inside casing 201. Sensors 230 may include strain-sensitive elements for measuring strain in cement 205, and may include other components as well as described further below, such as RFID tags. Sensors 230 may be placed into cement 205 through the process described above with respect to FIGS. 2A-2B. Once sensors 230 are in place, they may collect one or more measurements, such as strain measurements using a strain-sensitive element. Such measurements may be collected by data collection tools 310. Data collection tools 310 may include a processor and memory device, and may accordingly store the measurements in the memory for later collection by interrogation tool 311. Data collection tools 310 may be coupled to casing 201 such that they have visibility into annulus 202 of wellbore 103, and may communicate with sensors 230 disposed therein. Data collection tools 310 may communicate with sensors 230 using any suitable technique, such as using RF signals or other forms of wireless communication within annulus 202. In certain embodiments, data collection tools 310 may be disposed on a casing coupler 312 that joins two lengths of casing 201 together with one another.

To collect the information stored in data collection tools, interrogation tool 311 may be lowered downhole inside casing 201 using cable 305 and positioned proximate to data collection tools 310 as shown. Interrogation tool 311 may include a processor and memory device, and may collect the measurements or other information from data collection tools 310 using any suitable form of communication (e.g., one that may pass through casing 201, which may be metallic). For example, interrogation tool 311 may send magnetic interrogating signals or acoustic (e.g., ultrasonic) interrogating signals to data collection tools 310 to collect the information collected from sensors 230 by data collection tools 310. The information passed to interrogation tool 311 may then be communicated uphole (e.g., to a control unit similar to control unit 110 of FIG. 1) using cable 305. In other embodiments, however, communication of the information collected and stored by data collection tools 310 may be transmitted uphole through communication via casing 201 rather than using interrogation tool 311. That is, communication signals, such as electrical, magnetic, or acoustic signals, may be sent through casing 201 to a control unit located uphole in particular embodiments.

Modifications, additions, or omissions may be made to FIG. 3 without departing from the scope of the present disclosure. For example, fewer components or additional components beyond those illustrated may be included, such as fewer or additional sensors 230 or data collection tools 310.

Figure 4:
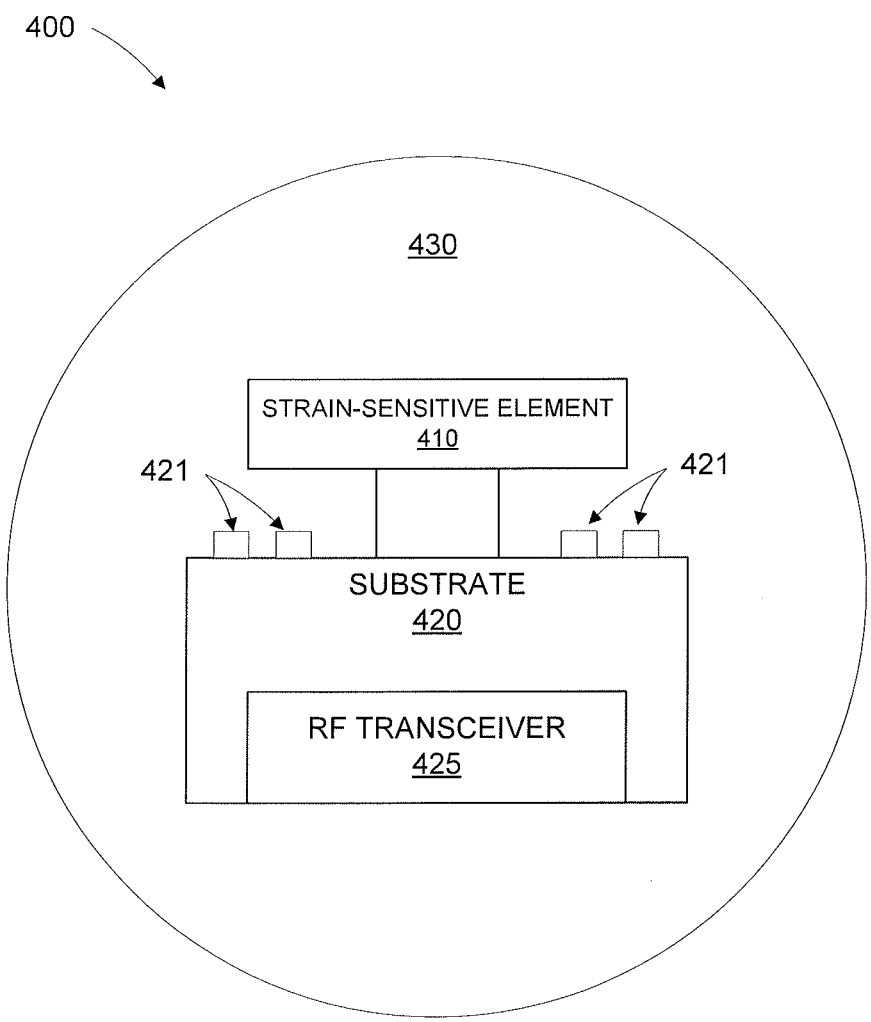
FIG. 4 illustrates an example strain gauge sensor in accordance with embodiments of the present disclosure.

FIG. 4 illustrates an example strain gauge sensor 400 in accordance with embodiments of the present disclosure. Strain gauge sensor 400 includes a strain-sensitive element 410 coupled to substrate 420. Strain-sensitive element 410 may be composed of polysilicon or any other suitable material whose resistance changes based on the force applied thereto. Strain-sensitive element 410 may be disposed separate from (i.e., not coupled directly to) substrate 420 as shown to avoid effects caused by the mechanical properties of substrate 420. For instance, substrate 420 may inflict unwanted forces to strain-sensitive element 410 that differ from those inflicted upon strain-sensitive element 410 by the outside environment (e.g., the cement surrounding sensor 400). Strain-sensitive element 410 may be a linear-resistive element whose resistance changes linearly with the forces (e.g., strain) applied thereto. Changes in the force or strain incident upon strain-sensitive element 410 may be measured using a four-point resistance method, in certain embodiments. In other embodiments, the strain-sensitive element may be in a resonant circuit with capacitors and/or inductors, and the changes in force incident upon the strain-sensitive element may be determined based on changes in the Q of the resonance of the resonant circuit. Substrate 420 includes circuit components 421 (e.g., capacitors and/or inductors, such as those illustrated in FIGS. 5A-5C or those included in a resonant circuit with strain-sensitive element 410). Substrate 420 further includes RF transceiver 425, which may be configured to send measurements to data collection tools coupled to the casing in a wellbore (e.g., data collection tools 310 of FIG. 3). Substrate 420 may be approximately 500 microns thick and 2 mm wide in certain embodiments, and may be made from quartz or silicon.

Strain-sensitive element 410 and substrate 420 are enveloped by encapsulant 430, which may be any suitable material. Encapsulant 430 may be a compliant material, such as epoxy in certain embodiments, which may allow strain forces present in the environment surrounding sensor 400 (e.g., cement in a wellbore such as cement 205 in FIG. 3) to be transferred to strain-sensitive element 410 for measurement. That is, a force present on the outer surface of encapsulant 430 may be transferred through encapsulant 430 to resistive element 410. The size and shape of encapsulant 430 (and thus sensor 400) may depend on the environment in which sensor 400 is used. For example, in certain embodiments, encapsulant 430 may have a diameter of less than 3 mm to avoid fit issues during the cementing process.

Modifications, additions, or omissions may be made to FIG. 4 without departing from the scope of the present disclosure. For example, fewer components or additional components beyond those illustrated may be included, such as circuit components 421. As another example, although illustrated as being mechanically separate from substrate 420, strain-sensitive element 410 may be coupled directly to substrate 420 in other embodiments. Furthermore, although described above as being an element whose resistance changes with forces applied thereto, in certain embodiments, strain-sensitive element 410 may be a component whose capacitance and/or inductance changes with force applied thereto.

Figure 5A:
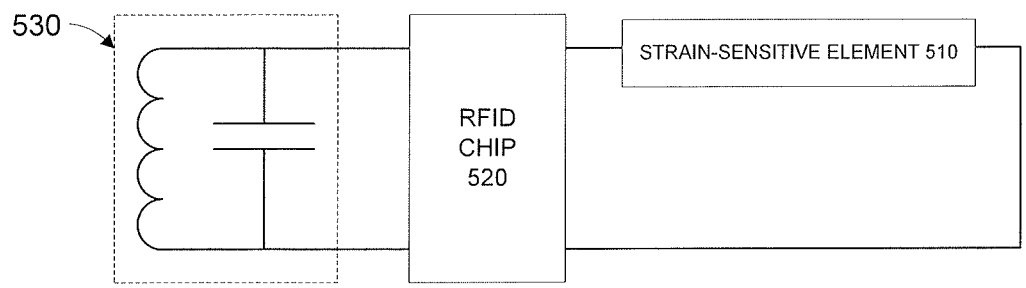
FIGS. 5A-5C illustrate aspects of a strain gauge sensor in accordance with embodiments of the present disclosure.
Figure 5B:
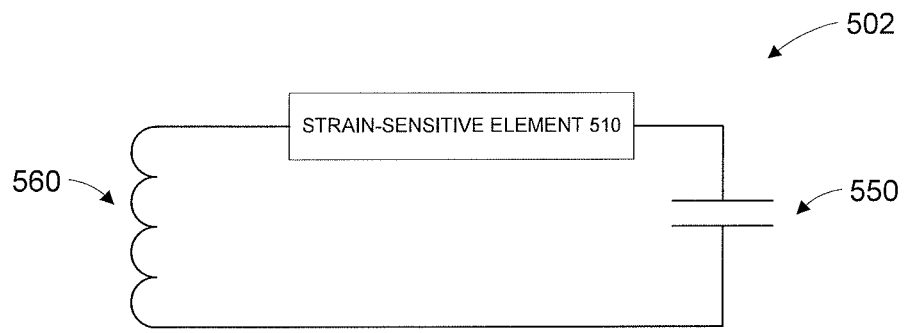
Figure 5C:
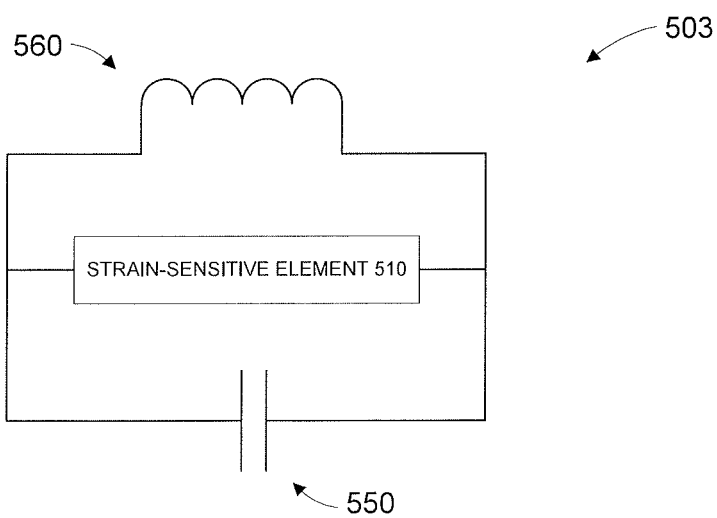

FIGS. 5A-5C illustrate aspects of a strain gauge sensor in accordance with embodiments of the present disclosure. More particularly, FIG. 5A illustrates an example of an active strain gauge 501 according to embodiments of the present disclosure, and FIGS. 5B-5C illustrate examples of passive strain gauges 502-503 according to embodiments of the present disclosure. Strain gauges 501-503 may be components of a sensor placed in an annulus of a wellbore, such as sensors 230 of FIGS. 2A-2B and FIG. 3 and sensor 400 of FIG. 4.

Referring to FIG. 5A, active strain gauge 501 includes strain-sensitive element 510, radio frequency identifier (RFID) chip 520, and inductor antenna components 530. Strain-sensitive element 510 may be any suitable material whose resistance changes as force is applied thereto. In operation, interrogating RF signals are transmitted to inductor antenna components 530 (e.g., from data collection tools similar to data collection tools 310 of FIG. 3) and response signals are sent in response thereto. The response signals may include information associated with RFID chip 520, such as sensor identification information, and may be based on the resistance of strain-sensitive element 510. Accordingly, as strain forces are applied to strain-sensitive element 510 (e.g., those present in cement surrounding the sensor device in which strain gauge 501 is incorporated), the signal sent back to the data collection tools may change. The changes in the response signal may therefore indicate changes in the strain present in the environment around the strain gauge 501, and strain may be measured using the detected changes in the response signals due to resistance changes in strain-sensitive element 510.

Referring now to FIGS. 5B-5C, passive strain gauges 502 and 503 each include strain-sensitive element 510, capacitor 550, and inductor antenna 560. Passive strain gauges 502-503 are examples of resonant RLC circuits, whose Q may change as force is applied to strain-sensitive element 510. More particularly, passive strain gauge 502 includes components in a series architecture, and passive strain gauge 503 includes components in a parallel architecture.

In operation, interrogating RF signals are transmitted to inductor antenna 560 (e.g., from data collection tools similar to data collection tools 310 of FIG. 3) and response signals are sent in response thereto. The response signals may depend on the Q of the resonant RLC circuit (and thus the resistance of strain-sensitive element 510). Accordingly, as strain is incident upon strain-sensitive element 510 (e.g., strain present in cement surrounding the sensor device in which strain-sensitive element 510 is incorporated), the signal sent back to the data collection tools may change. The changes in the response signal may therefore indicate changes in the strain present in the environment around the strain gauge 510, and strain may be measured using the detected changes in Q of the resonant circuit.

In particular embodiments, passive strain gauges 502-503 may include a strain-sensitive element 510 whose capacitance and/or inductance changes as force is applied thereto. The resistance of strain-sensitive element 510 may be minimal, such as approximately zero, in such embodiments to allow for sufficient amounts of Q to enable remote RF interrogation and/or measurement of the gauge as described above. In addition, in such embodiments, strain-sensitive element 510 may have approximately zero inductance, and only the capacitance of strain-sensitive element 510 may change as forces are applied thereto. The capacitance in such embodiments of strain-sensitive element 510 may change monotonically (e.g., linearly) with the strain applied thereto.

In some embodiments, the resistance, capacitance, and/or inductance of strain-sensitive element 510 may change such that the Q of the resonant circuit (e.g., the frequency width of the resonance of the circuit) remains approximately constant as forces are applied to strain-sensitive element 510.

Modifications, additions, or omissions may be made to FIGS. 5A-5C without departing from the scope of the present disclosure. For example, fewer components or additional components beyond those illustrated may be included, such as additional circuit components (e.g., capacitors and inductors).

Figure 6:
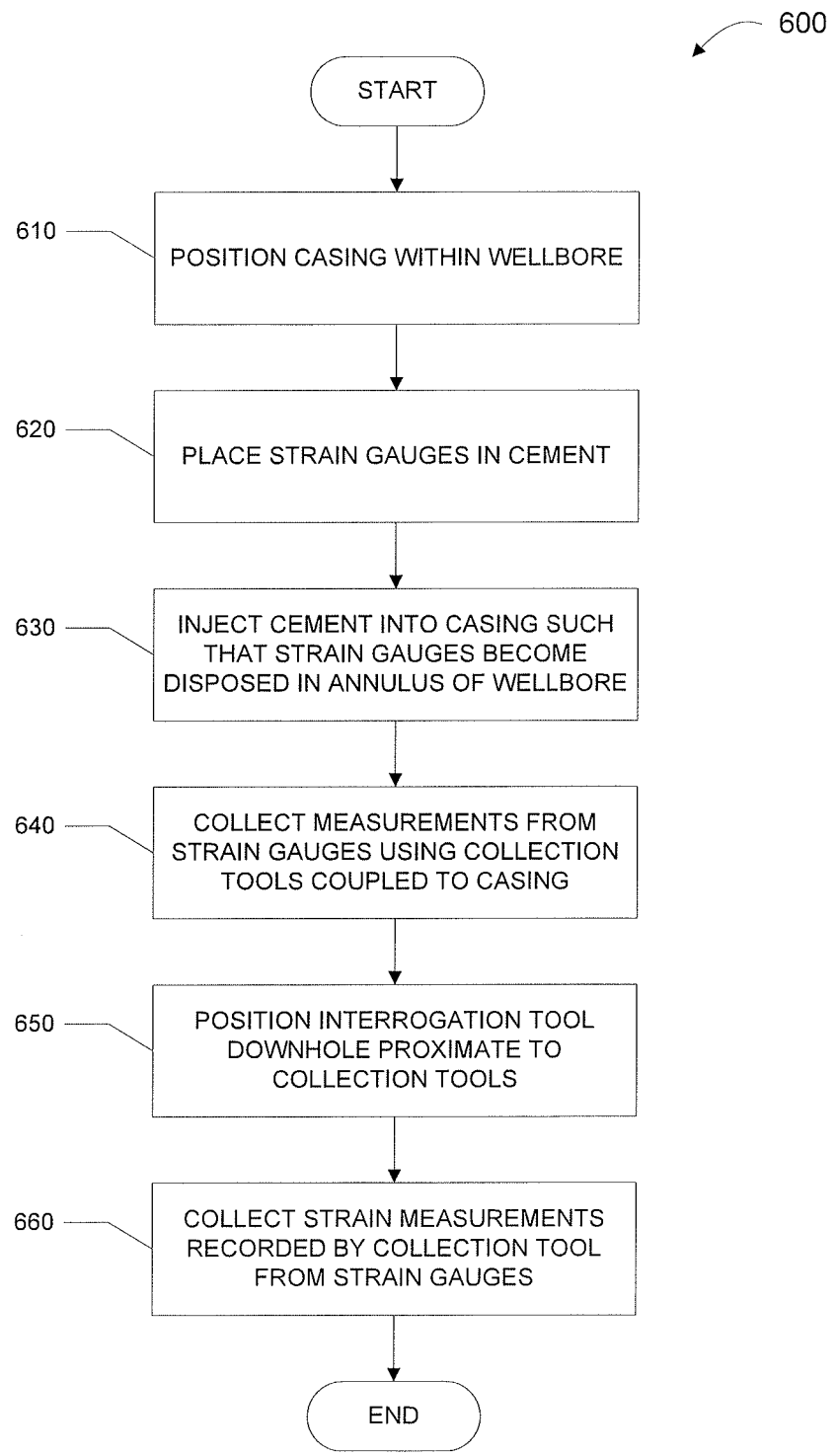
FIG. 6 illustrates an example method for positioning strain gauge sensors into a wellbore and receiving measurements therefrom in accordance with embodiments of the present disclosure.

FIG. 6 illustrates an example method 600 for positioning strain gauge sensors into a wellbore and receiving measurements therefrom in accordance with embodiments of the present disclosure. The method begins at step 610, where one or more casings are positioned within a wellbore. The casing may have one or more data collection tools coupled thereto, such as at a casing coupler that joins two lengths of casing together with one another. The data collection tools may be similar to data collection tools 310 described above with respect to FIG. 3. One or more sensor devices comprising strain gauges are then placed into cement at step 620, and the cement (with the sensor devices disposed therein) is then injected into the casing at step 630 such that the sensor devices become disposed with the cement in the annulus of the wellbore. The sensor devices may be similar to sensor 400 of FIG. 4 and steps 610-630 may resemble the wellbore casing and cementing operation described above with respect to FIGS. 2A-2B, with the resulting system resembling aspects of system 300 of FIG. 3.

Once the sensor devices have been positioned within the cement in the annulus of the wellbore, at step 640, measurements are collected from the strain gauges of the sensor devices using the one or more data collection tools coupled to the casing in the wellbore. The data collection tools may communicate with the sensor devices using any suitable communication method, and may use RF signals in certain embodiments. The measurements or other information collected from the sensor devices may be stored in the data collection tools for later retrieval and/or analysis. At step 650, an interrogation tool is lowered downhole and positioned proximate to the data collection tools, and the measurements collected by the data collection tools and/or other information are then collected by the interrogation tool at step 660. The interrogation tool and data collection tool may communicate using any suitable communication method, and may use magnetic or acoustic (e.g., ultrasonic) signals in certain embodiments.

Modifications, additions, or omissions may be made to method 600 of FIG. 6 without departing from the scope of the present disclosure. For example, steps of method 600 may be performed in a different order than indicated or may be performed simultaneously with one or more other steps in method 600. In addition, method 600 may comprise fewer or additional steps than those illustrated in FIG. 6 and described above.

To provide illustrations of one or more embodiments of the present disclosure, the following examples are provided.

In one or more embodiments, a system includes a casing disposed within a wellbore, one or more data collection tools coupled to the casing, and one or more sensors disposed within an annulus of the wellbore. Each of the one or more sensors include a substrate, a strain-sensitive element coupled to the substrate, and a transceiver coupled to the substrate and configured to communicate with the one or more data collection tools.

In one or more of the embodiments disclosed in the preceding paragraph, the one or more sensors are disposed in cement in the annulus of the wellbore.

In one or more of the embodiments disclosed in the preceding two paragraphs, the system further includes an encapsulant enveloping the strain-sensitive element, the transceiver, and the substrate. In one or more of the embodiments, the encapsulant is a compliant material.

In one or more of the embodiments disclosed in the preceding three paragraphs, the strain-sensitive element is coupled to a radio frequency identifier (RFID) chip.

In one or more of the embodiments disclosed in the preceding four paragraphs, the strain-sensitive element is coupled to a capacitor and an inductor in a resonant circuit.

In one or more of the embodiments disclosed in the preceding five paragraphs, the strain-sensitive element is mechanically separated from the substrate.

In one or more of the embodiments disclosed in the preceding six paragraphs, the strain-sensitive element is a linear-resistive element whose resistance changes linearly with strain applied thereto.

In one or more of the embodiments disclosed in the preceding seven paragraphs, the strain-sensitive element is a component whose capacitance changes monotonically with strain applied thereto.

In one or more of the embodiments disclosed in the preceding eight paragraphs, the strain-sensitive element is a component whose inductance changes monotonically with strain applied thereto.

In one or more of the embodiments disclosed in the preceding nine paragraphs, the system further includes an interrogation tool disposed within the casing and proximate to the data collection tools.

In one or more of the embodiments disclosed in the preceding ten paragraphs, the one or more data collection tools are coupled to casing couplers that join two lengths of casing together.

In one or more embodiments, a method includes positioning a casing within the wellbore, the casing having a data collection tool coupled thereto, positioning a sensor in cement within the casing, and injecting the cement into the casing such that the sensor becomes disposed in an annulus of the wellbore.

In one or more of the embodiments disclosed in the preceding paragraph, the method further includes collecting and storing sensor information from the sensor using the data collection tool.

In one or more of the embodiments disclosed in the preceding two paragraphs, collecting information from the sensor using the data collection tool comprises sending a first interrogating signal from the data collection tool to the sensor.

In one or more of the embodiments disclosed in the preceding three paragraphs, the method further includes collecting the sensor information from the data collection tool using an interrogator tool disposed within the wellbore.

In one or more of the embodiments disclosed in the preceding four paragraphs, collecting the sensor information from the data collection tool using the interrogator tool comprises sending a second interrogating signal from the interrogator tool to the data collection tool.

In one or more of the embodiments disclosed in the preceding five paragraphs, the second interrogating signal is a magnetic signal. In one or more of the embodiments disclosed in the preceding five paragraphs, the second interrogating signal is an acoustic signal.

In one or more of the embodiments disclosed in the preceding six paragraphs, positioning a sensor in cement within the casing comprises positioning a bottom plug within the casing, the bottom plug comprising a diaphragm, adding cement to the interior of the casing behind the bottom plug, positioning the sensor in the cement, positioning a top plug within the casing, and injecting the cement into the interior of the casing comprises adding pressure to the top plug until the diaphragm is broken to allow the cement to flow within the annulus of the wellbore.

Therefore, the present disclosure is well-adapted to carry out the objects and attain the ends and advantages mentioned as well as those which are inherent therein. While the disclosure has been depicted and described by reference to exemplary embodiments of the disclosure, such a reference does not imply a limitation on the disclosure, and no such limitation is to be inferred. The disclosure is capable of considerable modification, alteration, and equivalents in form and function, as will occur to those ordinarily skilled in the pertinent arts and having the benefit of this disclosure. The depicted and described embodiments of the disclosure are exemplary only, and are not exhaustive of the scope of the disclosure. Consequently, the disclosure is intended to be limited only by the spirit and scope of the appended claims, giving full cognizance to equivalents in all respects. The terms in the claims have their plain, ordinary meaning unless otherwise explicitly and clearly defined by the patentee.

The terms "couple" or "couples" as used herein are intended to mean either an indirect or a direct connection. Thus, if a first device couples to a second device, that connection may be through a direct connection, or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections. Finally, the term "uphole" as used herein means along the drill string or the hole from the distal end towards the surface, and "downhole" as used herein means along the drill string or the hole from the surface towards the distal end.

What is claimed is:

1. A system, comprising:
    a casing disposed within a wellbore;
    one or more data collection tools coupled to the casing; and
    one or more sensors disposed within an annulus of the wellbore, each of the one or more sensors comprising:
        a substrate;
        a strain-sensitive element disposed separate from the substrate; and
        a transceiver coupled to the substrate and configured to communicate with the one or more data collection tools.

2. The system of claim 1, wherein the one or more sensors are disposed in cement in the annulus of the wellbore.

3. The system of claim 1, further comprising an encapsulant enveloping the strain-sensitive element, the transceiver, and the substrate.

4. The system of claim 3, wherein the encapsulant is a compliant material.

5. The system of claim 1, wherein the strain-sensitive element is coupled to a radio frequency identifier (RFID) chip.

6. The system of claim 1, wherein the strain-sensitive element is coupled to a capacitor and an inductor in a resonant circuit.

7. The system of claim 1, wherein the strain-sensitive element is mechanically separated from the substrate.

8. The system of claim 1, wherein the strain-sensitive element is a linear-resistive element whose resistance changes linearly with strain applied thereto.

9. The system of claim 1, wherein the strain-sensitive element is a component whose capacitance changes monotonically with strain applied thereto.

10. The system of claim 1, wherein the strain-sensitive element is a component whose inductance changes monotonically with strain applied thereto.

11. The system of claim 1, further comprising an interrogation tool disposed within the casing and proximate to the data collection tools.

12. The system of claim 1, wherein the one or more data collection tools are coupled to casing couplers that join two lengths of casing together.

13. A method, comprising:
    positioning a casing within the wellbore, the casing having a data collection tool coupled thereto;
    positioning a sensor in cement within the casing, wherein the sensor comprises a substrate, a strain-sensitive element disposed separate from the substrate and a transceiver coupled to the substrate and configured to communicate with the data collection tool; and
    injecting the cement into the casing such that the sensor becomes disposed in an annulus of the wellbore.

14. The method of claim 13, further comprising collecting and storing sensor information from the sensor using the data collection tool.

15. The method of claim 14, wherein collecting information from the sensor using the data collection tool comprises sending a first interrogating signal from the data collection tool to the sensor.

16. The method of claim 14, further comprising collecting the sensor information from the data collection tool using an interrogator tool disposed within the wellbore.

17. The method of claim 16, wherein collecting the sensor information from the data collection tool using the interrogator tool comprises sending a second interrogating signal from the interrogator tool to the data collection tool.

18. The method of claim 17, wherein the second interrogating signal is a magnetic signal.

19. The method of claim 17, wherein the second interrogating signal is an acoustic signal.

20. The method of claim 13, wherein positioning a sensor in cement within the casing comprises:
    positioning a bottom plug within the casing, the bottom plug comprising a diaphragm;
    adding cement to the interior of the casing behind the bottom plug;
    positioning the sensor in the cement;
    positioning a top plug within the casing; and
    injecting the cement into the interior of the casing comprises adding pressure to the top plug until the diaphragm is broken to allow the cement to flow within the annulus of the wellbore.

* * * * *